W. T. Nicholson
File,

N° 58,025.  Patented Sep. 11, 1866.

Witnesses;
Benj. F. Thurston
George B. Barrows

Inventor;
Wm T. Nicholson

UNITED STATES PATENT OFFICE.

WILLIAM T. NICHOLSON, OF PROVIDENCE, RHODE ISLAND, ASSIGNOR TO THE NICHOLSON FILE COMPANY, OF SAME PLACE.

IMPROVEMENT IN FILES.

Specification forming part of Letters Patent No. 58,025, dated September 11, 1866.

*To all whom it may concern:*

Be it known that I, WILLIAM T. NICHOLSON, of the city and county of Providence, in the State of Rhode Island, have invented an Improvement in Files; and I do hereby declare that the following specification, taken in connection with the drawings, making a part of the same, is a full, clear, and exact description thereof.

Figure 1:
Figure 2:

Figure 1 is a view of one variety of my improved file. Fig. 2 is a view of a round file as usually cut by hand.

Round files and those which have a portion of their surfaces curved around their axes, unlike flat files, do not have their teeth formed by the intersection of two cross-cuts in the metal of the file, produced by setting the edge of the cutter at one angle with the axis of the file-blank to make one row of teeth, and at another angle with such axis to make the second row, which is cut diagonally with the first.

When round or half-round files are cut by hand the teeth are arranged in rows extending from one end of the file to the other, each tooth being distinct by itself, and the rows separated by a space or furrow, as shown in Fig. 2. As the result of this disposition of the teeth, and from the fact that each tooth is cut deeper in the middle than at the edges, it is difficult to dress a curved surface with accuracy by the use of such a file. To avoid this difficulty, round and partly-round files have been made by machinery with the rows of teeth cut in lines winding in continuous spirals around the axis of the file, each cut to form a tooth commencing where the last cut left off, so that in effect the surface of the file is provided with as many teeth as there are spiral lines, and each line winds like a screw-thread around the axis of the file; but although a file with its teeth so cut is an improvement in the respect mentioned over a file whose teeth are cut in straight rows, yet this method of cutting the teeth is accompanied with another disadvantage quite as important as the one which is obviated. It has been found that workmen, in using a file so cut, will naturally give to it a twisting movement, induced by the tendency of the file to follow the furrows which will be made in the metal by the spirally-cut lines of teeth, and thus, unless care be exercised to prevent it, the hole or other curved surface to be dressed will be rendered correspondingly winding.

My invention obviates this difficulty by removing the tendency of the file, when used even by inexperienced hands, to run in any particular course.

It consists in cutting the several teeth precisely as when cut by hand, thereby preserving their distinctive character, instead of joining them together, as when cut in a continuous spiral, but in arranging them so that while each tooth is distinct and separate from any other, no two successive teeth will be comprehended between the same lines upon the surface of the file, formed by two planes passing through the longitudinal axis, nor will there be any continuous furrow, either between the several teeth or the several lines of teeth, which will coincide with any direction which the file has a tendency to take as it is being used. I am enabled thus to preserve the advantages of a tooth whose cutting-edge is at right angles with the line of motion of the file in working, or at any preferred angle therewith, and at the same time avoid the objection incident to the use of a file with such teeth when the same are arranged in straight or continuous spiral rows.

A convenient way to produce the file which I have described I have found to be by the use of a machine substantially like that described in the Letters Patent granted to me in two divisions, dated April 5, 1864, with the addition of a means for giving a rocking motion to the rolling bed upon which the blank is fixed; but the same result can be accomplished upon any machine for cutting files which makes use of a bed for the file having a positive feed motion under the cutter, or which is stationary while the cutter has a positive motion over the bed, but to which bed a rolling motion can be given as the cutter is performing its work. A convenient way of giving such rolling motion to the file-bed during the operation of cutting the file will be found to be in the use of a former, which may be attached to the top surface of the main bed, if the bed has a positive feed motion, or to the moving carriage which carries the cutter, if the bed is stationary, and the shape of which former will, as a lever-arm connected with the rolling bed moves over the same, cause the said rolling bed to receive a vibratory motion incidental to the configuration of the surface of the former. After one row has been cut the file is shifted in its position, and the next and succeeding rows are cut in the same way as the first.

What I claim as my invention, and desire to secure as a new article of manufacture, is—

A round or curved surfaced file the teeth of which are severally distinct as when cut by hand, but the rows of which are arranged in wave-lines, substantially as described.

WM. T. NICHOLSON.

Witnesses:
 BENJ. F. THURSTON,
 GEORGE B. BARROWS.